United States Patent
Inao et al.

(10) Patent No.: US 9,469,257 B2
(45) Date of Patent: Oct. 18, 2016

(54) WIRE HARNESS

(71) Applicant: Yazaki Corporation, Tokyo (JP)

(72) Inventors: Shinichi Inao, Makinohara (JP);
Hideomi Adachi, Makinohara (JP);
Yoshiaki Ozaki, Makinohara (JP)

(73) Assignee: YAZAKI CORPORATION, Tokyo (JP)

( * ) Notice: Subject to any disclaimer, the term of this patent is extended or adjusted under 35 U.S.C. 154(b) by 39 days.

(21) Appl. No.: 14/523,297

(22) Filed: Oct. 24, 2014

(65) Prior Publication Data

US 2015/0041210 A1   Feb. 12, 2015

Related U.S. Application Data

(63) Continuation of application No. PCT/JP2013/062869, filed on Apr. 26, 2013.

(30) Foreign Application Priority Data

Apr. 26, 2012   (JP) ................................. 2012-100559
Sep. 26, 2012   (JP) ................................. 2012-211738

(51) Int. Cl.
*H01B 7/00*   (2006.01)
*B60R 16/02*   (2006.01)

(52) U.S. Cl.
CPC ................................. *B60R 16/0215* (2013.01)

(58) Field of Classification Search
CPC .................. B60R 16/0207; B60R 16/0215
USPC ....................................... 174/72 A
See application file for complete search history.

(56) References Cited

U.S. PATENT DOCUMENTS

| 7,601,913 | B2 | 10/2009 | Kim et al. | |
|---|---|---|---|---|
| 2001/0023767 | A1 | 9/2001 | Berninger et al. | |
| 2005/0011687 | A1 | 1/2005 | Yamaguchi et al. | |
| 2006/0131048 | A1* | 6/2006 | Kogure | H02G 11/00 174/72 A |
| 2006/0134970 | A1* | 6/2006 | Watanabe | H02G 11/00 439/501 |
| 2006/0191585 | A1* | 8/2006 | Mori | F16L 11/11 138/121 |
| 2006/0223351 | A1 | 10/2006 | Kim et al. | |
| 2010/0043225 | A1 | 2/2010 | Oga et al. | |
| 2011/0067920 | A1* | 3/2011 | Toyama | B60R 16/0207 174/72 A |
| 2011/0088945 | A1 | 4/2011 | Yanagimoto et al. | |

(Continued)

FOREIGN PATENT DOCUMENTS

| CN | 1849043 A | 10/2006 |
|---|---|---|
| CN | 102035155 A | 4/2011 |

(Continued)

OTHER PUBLICATIONS

International Search Report (PCT/ISA/210); issued Jul. 29, 2013; in International Application No. PCT/JP2013/062869.

(Continued)

*Primary Examiner* — Sherman Ng
(74) *Attorney, Agent, or Firm* — Sughrue Mion, PLLC

(57) ABSTRACT

A wire harness includes one or more electrically-conducting paths, and a tubular exterior member configured to cover the electrically-conducting paths. The exterior member is a resin member including a flexible tubular part having flexibility and a less-flexible tubular part having less flexibility than that of the flexible tubular part. The exterior member is integrally formed to have a linear shape as a whole in a state where the flexible tubular part is not deflected.

11 Claims, 11 Drawing Sheets

(56) References Cited

U.S. PATENT DOCUMENTS

| | | |
|---|---|---|
| 2011/0094796 A1* | 4/2011 | Toyama .............. B60R 16/0207 174/72 A |
| 2011/0132638 A1 | 6/2011 | Oga et al. |
| 2016/0217886 A1 | 7/2016 | Toyama et al. |

FOREIGN PATENT DOCUMENTS

| | | |
|---|---|---|
| CN | 102067741 A | 5/2011 |
| DE | 102005046194 A1 | 4/2007 |
| EP | 0235924 A1 | 9/1987 |
| EP | 0418882 A2 | 3/1991 |
| EP | 0543469 A1 | 5/1993 |
| EP | 1137139 A2 | 9/2001 |
| FR | 638417 A | 5/1928 |
| JP | 63-91787 U | 6/1988 |
| JP | 08331728 A | 12/1996 |
| JP | 2000-125437 A | 4/2000 |
| JP | 2004224156 A | 8/2004 |
| JP | 2009-183013 A | 8/2009 |
| JP | 2009214631 A | 9/2009 |
| JP | 2009-232565 A | 10/2009 |
| JP | 2010051042 A | 3/2010 |
| JP | 2011-72079 A | 4/2011 |

OTHER PUBLICATIONS

Written Opinion (PCT/ISA/237); issued Jul. 29, 2013; in International Application No. PCT/JP2013/062869.

Communication dated Dec. 2, 2015, from the State Intellectual Property Office of People's Republic of China in counterpart Application No. 201380021795.8.

Communication dated Apr. 25, 2016, from the State Intellectual Property Office of People's Republic of China in counterpart Application No. 201380021795.8.

Communication dated Feb. 23, 2016, from the European Patent Office in counterpart European Application No. 13723983.6.

Communication dated Jul. 26, 2016 issued by the Japanese Patent Office in counterpart Japanese Patent Application No. 2012-211738.

* cited by examiner

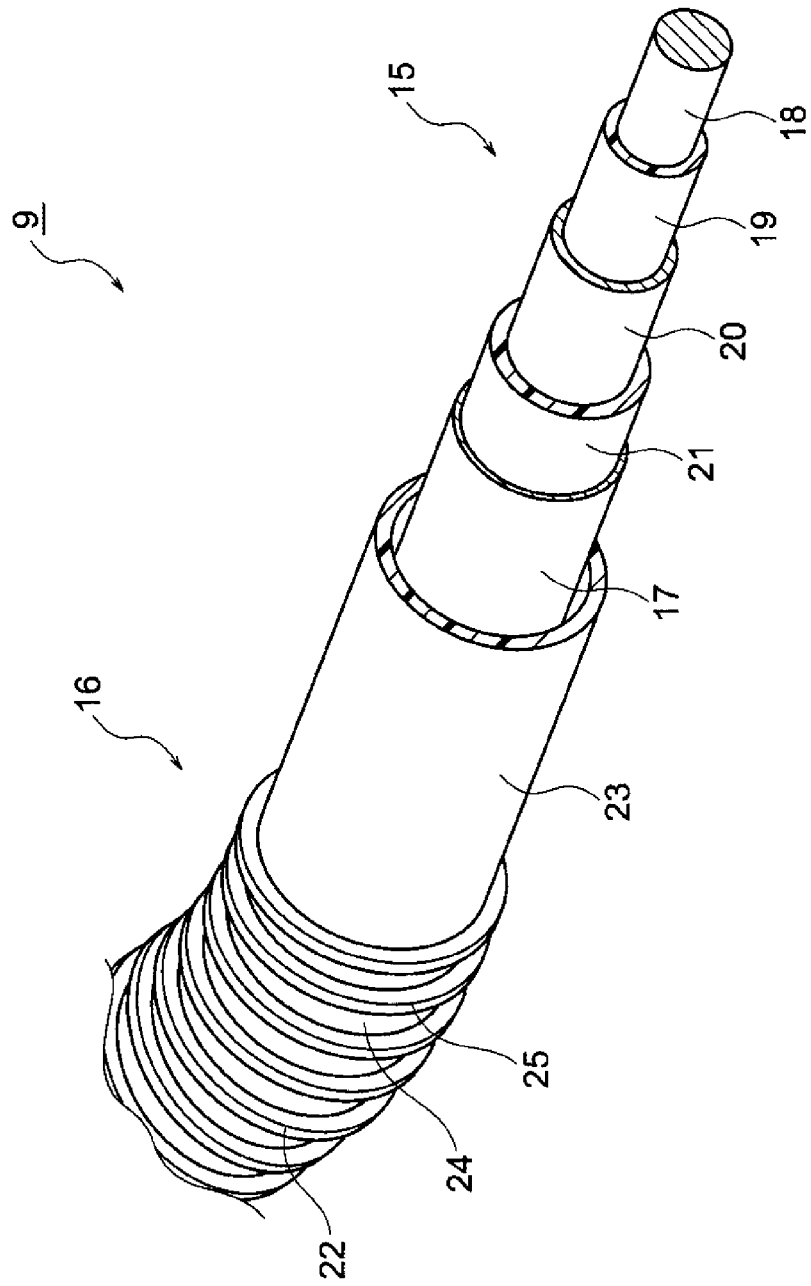

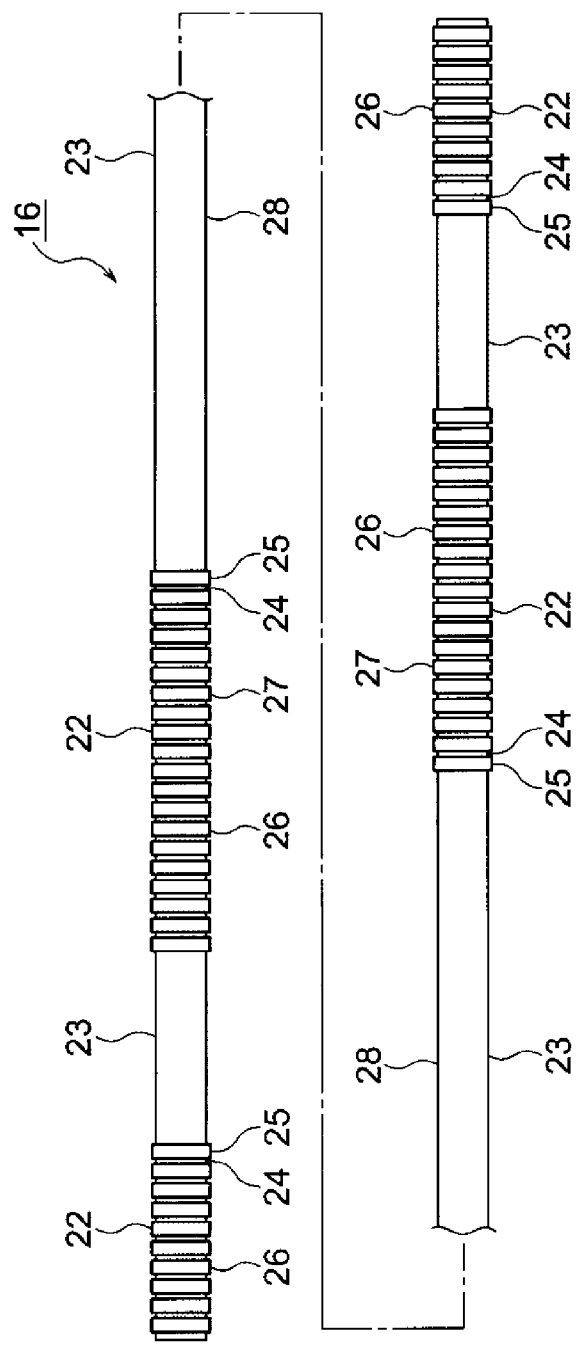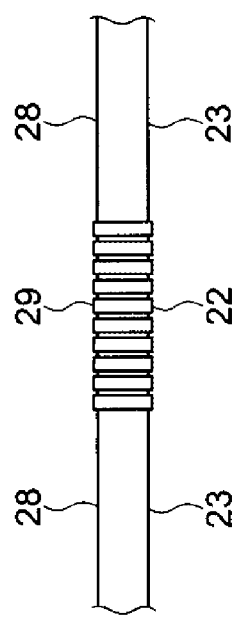
FIG.3A
FIG.3B

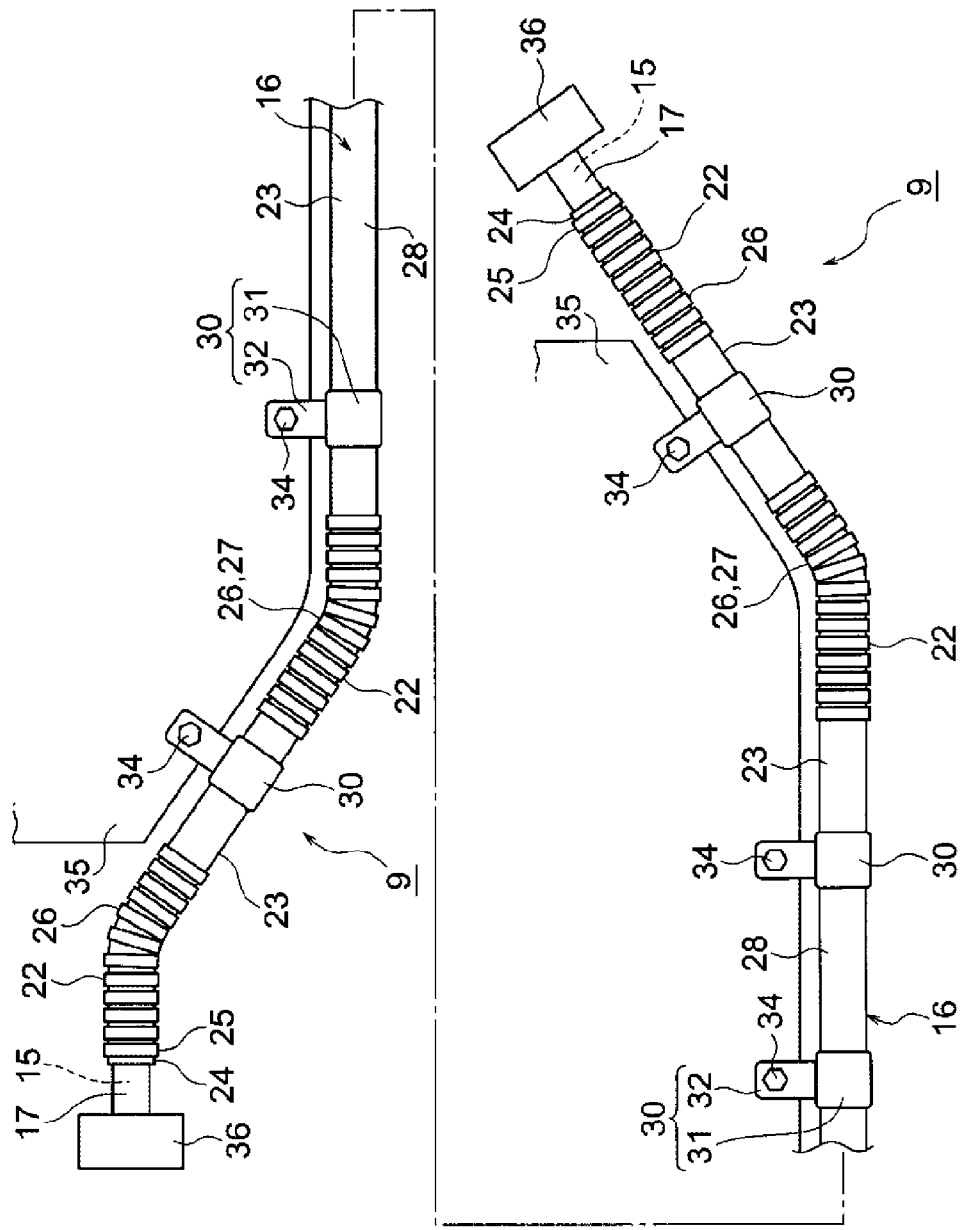

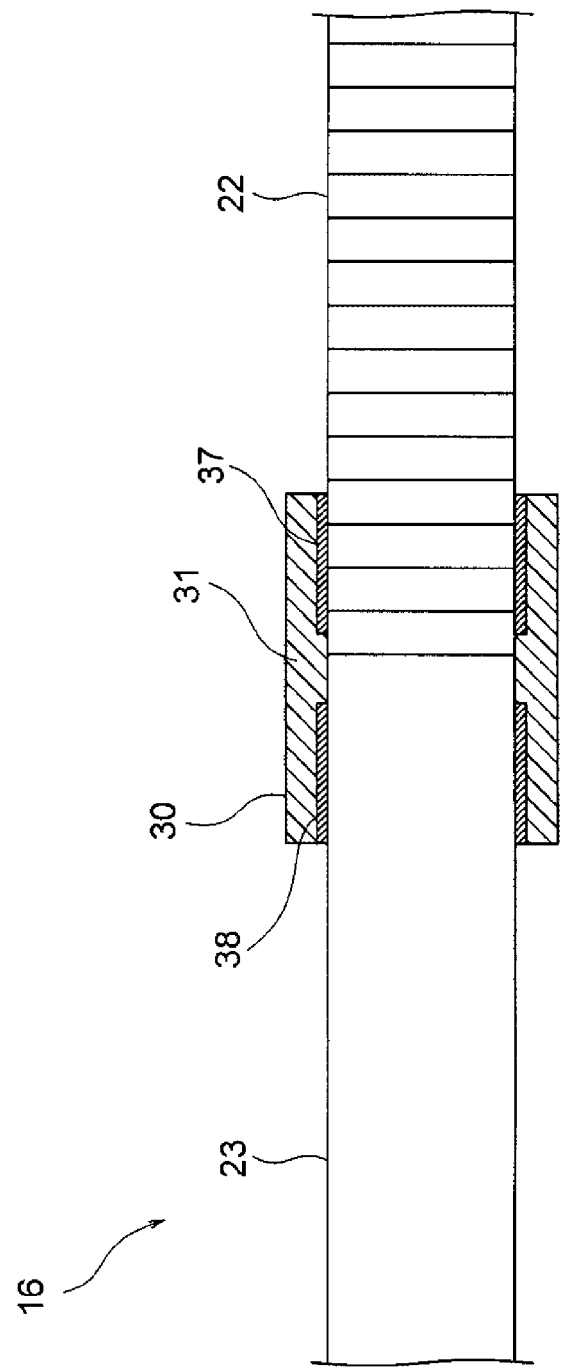

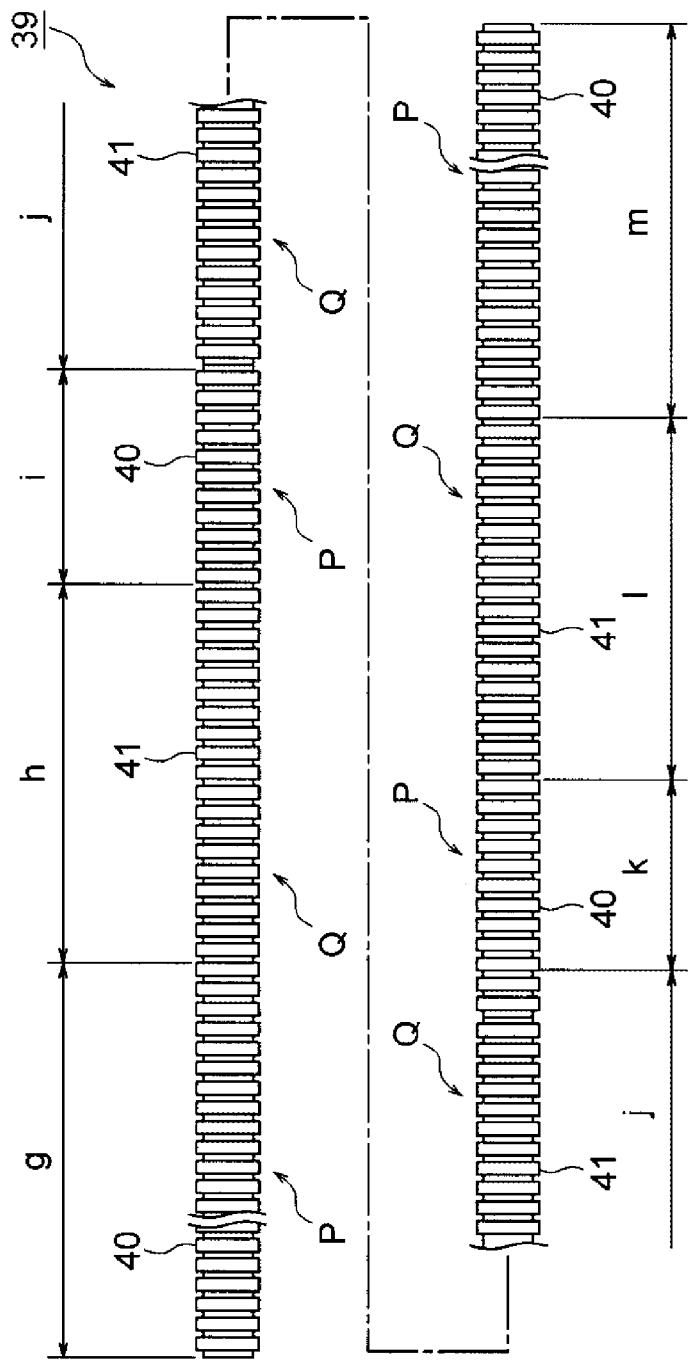

WIRE HARNESS

CROSS REFERENCE TO RELATED APPLICATIONS

This application is a continuation of PCT application No. PCT/JP2013/062869, which was filed on Apr. 26, 2013 based on Japanese Patent Applications No. 2012-100559 filed on Apr. 26, 2012 and No. 2012-211738 filed on Sep. 26, 2012, the contents of which are incorporated herein by reference.

BACKGROUND OF THE INVENTION

1. Field of the Invention

The present invention relates to a wire harness including an electrically-conducting path and an exterior member.

2. Description of the Related Art

A wire harness is used as a member to electrically connect between high-voltage devices in hybrid or electric vehicles.

A wire harness disclosed in JP-A-2004-224156 includes a plurality of high-voltage electric wires (electrically-conducting paths) and a plurality of metallic pipes to individually accommodate the high-voltage electric wires. The wire harness is an elongated member extending from the front toward the rear of a vehicle and routed along a predetermined route.

The wire harness is manufactured into a three-dimensional shape to match the predetermined route by inserting high-voltage electric wires through a straight metallic pipe and then bending the metallic pipe. After manufacturing, the wire harness is transported up to a vehicle as a routed object while maintaining the three-dimensional shape.

However, since the wire harness disclosed in JP-A-2004-224156 is manufactured in a three-dimensional shape and transported while maintaining the three-dimensional shape, there is a problem that it is necessary to secure a large space during transport.

A wire harness disclosed in JP-A-2010-51042 is effective for this problem. That is, the wire harness disclosed in JP-A-2010-51042 is configured to include a plurality of electrically-conducting paths, a resin corrugated tube to collectively accommodate the plurality of electrically-conducting paths and a resin protector. The corrugated tube is formed in a shape of bellows tube having flexibility and arranged in plural side by side in a longitudinal direction of the wire harness. The protector is arranged in portions requiring for route regulation and formed into a shape capable of regulating the route. The protector is provided so as to connect between ends of corrugated tubes adjacent to each other.

Since the wire harness disclosed in JP-A-2010-51042 can be bent in the portion of the corrugated tubes, the wire harness can be packed in a compact shape and therefore it is not necessary to secure a large space during transport.

SUMMARY OF THE INVENTION

The wire harness disclosed in JP-A-2004-224156 has a problem as follows, in addition to the above-described problem of securing a large space. That is, since the metallic pipe is used as an exterior member for the electrically-conducting path, there is a problem that the wire harness becomes heavy. On the other hand, since the corrugated tube or the protector is used as an exterior member in the wire harness disclosed in JP-A-2010-51042, there is a problem that the number of components is increased or man-hour for assembling is further required.

The present invention has been made in view of the above circumstances and an object of the present invention is to provide a wire harness which can be transported in a lightweight and compact state and a wire harness in which the number of components can be reduced and therefore it is possible to improve the assembling workability.

A first aspect of the present invention provides a wire harness including: one or more electrically-conducting paths; and a tubular exterior member configured to cover the electrically-conducting paths, wherein the exterior member is a resin member including a flexible tubular part having flexibility and a less-flexible tubular part having less flexibility than that of the flexible tubular part, and the exterior member is integrally formed to have a linear shape as a whole in a state where the flexible tubular part is not deflected.

According to a second aspect of the present invention, the wire harness may be configured so that the flexible tubular part is disposed at an arbitrary position to match a vehicle mount shape and deflected in a desired angle respectively during transport of the wire harness and during routing of the wire harness in a vehicle.

According to configurations as mentioned above, the wire harness is configured to include the resin exterior member. Since the exterior member is made from resin, the exterior member is lightweight. The exterior member includes flexible tubular parts and less-flexible tubular parts, which are integral and therefore the number of components is reduced. The exterior member is resin-molded in a straight shape. After being molded, the exterior member is deflected at desired angles in positions of the flexible tubular parts. Specifically, the exterior member can be deflected at desired angles respectively during transport of the wire harness and during routing of the wire harness in the vehicle. The wire harness can be transported in a compact state by the presence of the flexible tubular parts and also can be easily routed in the vehicle. The flexible tubular parts are returned to its original linear shape when there is no need to be deflected and therefore the flexible tubular parts are not hardened in a state being deflected. Thereby, the flexible tubular parts can be deflected at desired angles respectively during transport of the wire harness and during routing of the wire harness.

According to a third aspect of the present invention, the wire harness may be configured so that the exterior member is configured by mounting a later-attached component to the less-flexible tubular part.

According to the configurations as mentioned above, a later-attached component such as a clamp, a clip or a grommet, for example, is mounted to the less-flexible tubular parts and therefore the mounting property of the wire harness during routing is good. Further, according to the present aspect, since the less-flexible tubular parts have less flexibility than that of the flexible tubular parts and therefore are difficult to be deformed, the mounted state of the later-attached component is good. That is, the later-attached component is not released.

According to a fourth aspect of the present invention, the wire harness may be configured so that the exterior member is configured by integrally forming a vehicle fixed part to the less-flexible tubular part.

According to the configurations as mentioned above, since the less-flexible tubular parts are integrally formed with the vehicle fixed part such as a clamp or a clip, for example, the number of components including the members for fixation to the vehicle is reduced.

According to a fifth aspect of the present invention, the wire harness may be configured so that the flexible tubular part is formed in plural to have different lengths in a pipe axial direction.

According to the configurations as mentioned above, since a plurality of flexible tubular parts is provided to have different lengths, the flexible tubular parts can be deflected in a required length according to a vehicle mount shape, for example.

According to a sixth aspect of the present invention, the wire harness may be configured so that the less-flexible tubular part is formed in plural and, during transport of the wire harness, the exterior member is arranged in a state where the flexible tubular part is deflected in a folding manner and therefore the less-flexible tubular parts are disposed substantially parallel to each other.

According to the configurations as mentioned above, since the flexible tubular parts are deflected in a folding manner and therefore the less-flexible tubular parts are arranged substantially parallel to each other, the entire length of the wire harness is shortened and the wire harness is packed in a minimum width. Accordingly, the wire harness can be transported in a compact state. In the present invention, it is effective that the less-flexible tubular parts are arranged substantially parallel to and along the long less-flexible tubular portion.

According to a seventh aspect of the present invention, the wire harness may be configured so that the flexible tubular part includes a flexible tubular portion for transport which is deflected only during transport of the wire harness.

According to the configurations as mentioned above, since the flexible tubular portion for transport is included in the plurality of flexible tubular parts, the flexible tubular portion for transport is able to serve as a dedicated part which is deflected only during transport of the wire harness.

According to an eighth aspect of the present invention, the wire harness may be configured so that the flexible tubular part includes a flexible tubular portion for routing which is deflected only during routing of the wire harness.

According to the configurations as mentioned above, since the flexible tubular portion for routing is included in the plurality of flexible tubular parts, the flexible tubular portion for routing is able to serve as a dedicated part which is deflected only during routing of the wire harness.

According to a ninth aspect of the present invention, the wire harness may be configured so that the exterior member is configured by separately forming the flexible tubular part and the less-flexible tubular part in a split state, respectively and then integrating the divided flexible tubular parts and less-flexible tubular parts.

According to the configurations as mentioned above, since the flexible tubular parts and the less-flexible tubular parts are separately formed in a split state, respectively, the positions to be deflected, for example, can be arbitrarily set depending on the arrangement of the flexible tubular parts and the less-flexible tubular parts when integrating. Further, when the flexible tubular parts and the less-flexible tubular parts are separately formed in a split state, respectively, the long exterior member can be manufactured in various ways without using large-scale equipment. In addition, although the number of components prior to integration is increased, the number of components in the exterior member after integration is the same as the other related arts.

According to a tenth aspect of the present invention, the wire harness may be configured so that the exterior member is configured by separately forming the flexible tubular parts in a split state and/or separately forming the less-flexible tubular parts in a split state and then integrating the divided tubular parts.

According to the configurations as mentioned above, since the flexible tubular parts are separately formed in a split state and/or the less-flexible tubular parts are separately formed in a split state, the positions or ranges to be deflected, for example, can be arbitrarily set depending on the arrangement, the length or the number of the flexible tubular parts and the less-flexible tubular parts when integrating. Further, when the flexible tubular parts and the less-flexible tubular parts are separately formed in a split state, the long exterior member can be manufactured in various ways without using large-scale equipment.

According to an eleventh aspect of the present invention, the wire harness may be configured so that the exterior member is continuously formed while changing a thickness in a state where an outer shape and/or an inner shape thereof is unified and the exterior member is configured so that a thin portion as made is formed as the flexible tubular part and a thick portion as made thicker than the flexible tubular part is formed as the less-flexible tubular part.

According to the configurations as mentioned above, since the exterior member is formed by the change in the thickness thereof, thin portions which are easy to be deflected can be formed as the flexible tubular parts and thick portions which are difficult to be deflected can be formed as the less-flexible tubular parts. Further, according to the present aspect, since an outer shape and/or an inner shape of the exterior member are unified, a molding die according to such a unified shape can be made to have the same structure.

According to a twelfth aspect of the present invention, the wire harness may be configured so that the exterior member is configured so that both the flexible tubular part and the less-flexible tubular part are formed into a shape of bellows tube.

According to the configurations as mentioned above, since the exterior member is formed into a shape of bellows tube, a later-attached component such as a clamp, a clip or a grommet, for example, can be easily mounted to the exterior member using the shape of bellows tube.

According to a thirteenth aspect of the present invention, the wire harness may be configured so that the electrically-conducting path is a high-voltage coaxial composite electrically-conducting path which is configured by coaxially arranging a plurality of high-voltage circuits.

According to the configurations as mentioned above, since the high-voltage coaxial composite electrically-conducting path is configured by coaxially arranging a plurality of circuits, the size of the electrically-conducting path can be reduced, as compared to a case where a plurality of electrically-conducting paths is simply arranged. As a result, it is also possible to reduce a diameter of the exterior member. In addition, when the exterior member is deflected in a state where a plurality of electrically-conducting paths is arranged therein, an inner side electrically-conducting path and an outer side electrically-conducting path are present in the deflected portion and therefore deviation of length occurs in the end sides of the electrically-conducting path. However, since the high-voltage coaxial composite electrically-conducting path configured by coaxially arranging a plurality of circuits is employed in the present invention, the deviation of length does not occur. Accordingly, it is possible to prevent the deviation of length.

According to the first aspect or with the combination of the second aspect, there is an effect that it is possible to transport the wire harness in a lightweight and compact state. Further, there is an effect that the number of components is reduced and therefore it is possible to improve the assembling workability.

According to the third aspect, the following effect can be obtained, in addition to the effect of the first or second aspect. That is, there is an effect that it is possible to improve the mounting property of the wire harness during routing thereof. Further, there is an effect that it is also possible to improve the mounting stability of a later-attached component.

According to the fourth aspect, the following effect can be obtained, in addition to the effect of the first or second aspect. That is, there is an effect that it is possible to further reduce the number of components.

According to the fifth aspect, the following effect can be obtained, in addition to the effect of any one of the first to fourth aspects. That is, there is an effect that it is possible to provide the flexible tubular part having a better shape.

According to the sixth aspect, the following effect can be obtained, in addition to the effect of any one of the first to fifth aspects. That is, there is an effect that it is possible to transport the wire harness in more compact state.

According to the seventh aspect, the following effect can be obtained, in addition to the effect of the fifth or sixth aspect. That is, there is an effect that it is possible to provide a dedicated part which contributes to the transport of the wire harness in a compact state.

According to the eighth aspect, the following effect can be obtained, in addition to the effect of the fifth or sixth aspect. That is, there is an effect that it is possible to provide a dedicated part which contributes to the improvement of the assembling workability.

According to the ninth aspect, the following effect can be obtained, in addition to the effect of any one of the first to eighth aspects. That is, there is an effect that it is possible to provide a degree of freedom in arrangement of the flexible tubular part and the less-flexible tubular part.

According to the tenth aspect, the following effect can be obtained, in addition to the effect of any one of the first to eighth aspects. That is, there is an effect that it is possible to provide a degree of freedom in arrangement or range of the flexible tubular part and/or the less-flexible tubular part.

According to the eleventh aspect, the following effect can be obtained, in addition to the effect of any one of the first to eighth aspects. That is, there is an effect that it is possible to simply form the exterior member including the flexible tubular part and the less-flexible tubular parts by the change in the thickness thereof and it is also possible to simplify the structure of a molding die.

According to the twelfth aspect, the following effect can be obtained, in addition to the effect of eleventh aspect. That is, there is an effect that it is possible to provide the exterior member of shape which allows a later-attached component to be easily mounted thereto.

According to the thirteenth aspect, the following effect can be obtained, in addition to the effect of any one of the first to twelfth aspects. That is, there is an effect that it is possible to reduce the size of the wire harness and also it is possible to contribute to the transport of the wire harness in a compact state. Further, according to the present invention, there is an effect that it is possible to prevent the deviation of length in the end sides of the electrically-conducting path.

BRIEF DESCRIPTION OF THE DRAWINGS

FIG. 2 is a configuration view of an electrically-conducting path of the wire harness.

FIGS. 3A and 3B are configuration views of an exterior member of the wire harness.

FIG. 4 shows the wire harness during routing.

FIG. 8 is an enlarged view showing a portion of the exterior member in which a flexible tubular part and a less-flexible tubular part are integrated.

FIG. 9 is a configuration view of an exterior member according to still another embodiment (Third Embodiment).

DETAILED DESCRIPTION OF THE EXEMPLARY EMBODIMENTS

A wire harness is configured to include a resin exterior member. The exterior member is adapted to cover one or more electrically-conducting paths. The exterior member includes flexible tubular parts and less-flexible tubular parts, which are integral. The flexible tubular parts are disposed at arbitrary positions to match a vehicle mount shape and can be deflected at desired angles respectively during transport of the wire harness and during routing of the wire harness in the vehicle.

First Embodiment

Figure 1:
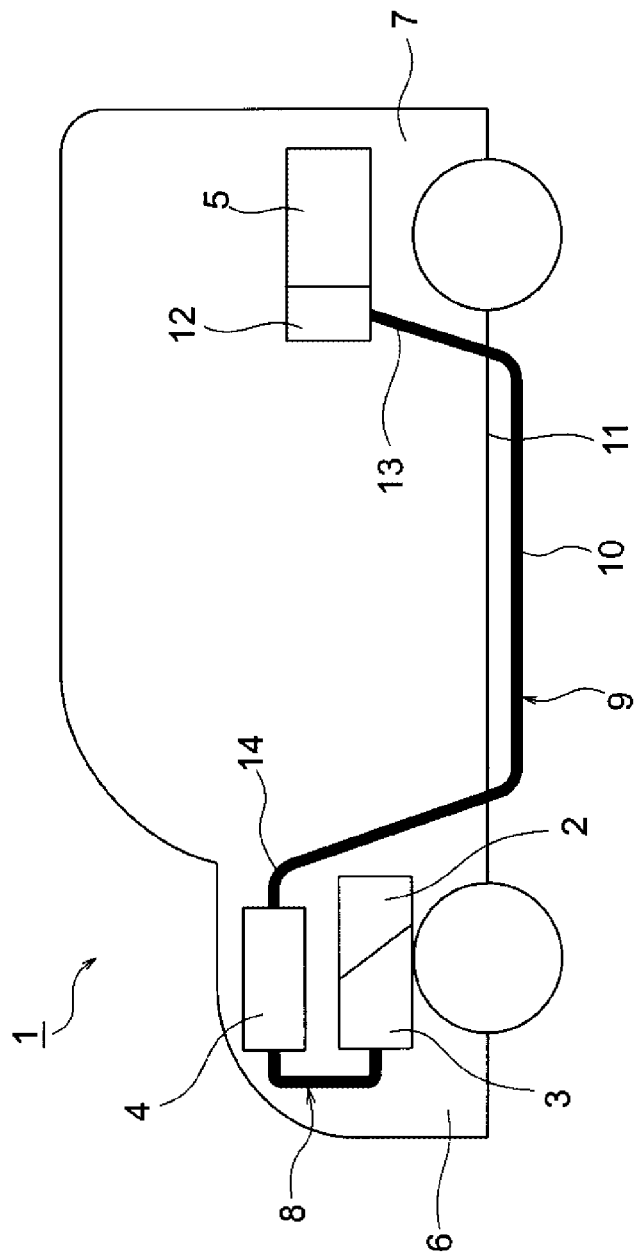
FIG. 1 is a schematic view showing a routed state of a wire harness according to an embodiment of the present invention (First Embodiment).
Figure 5:
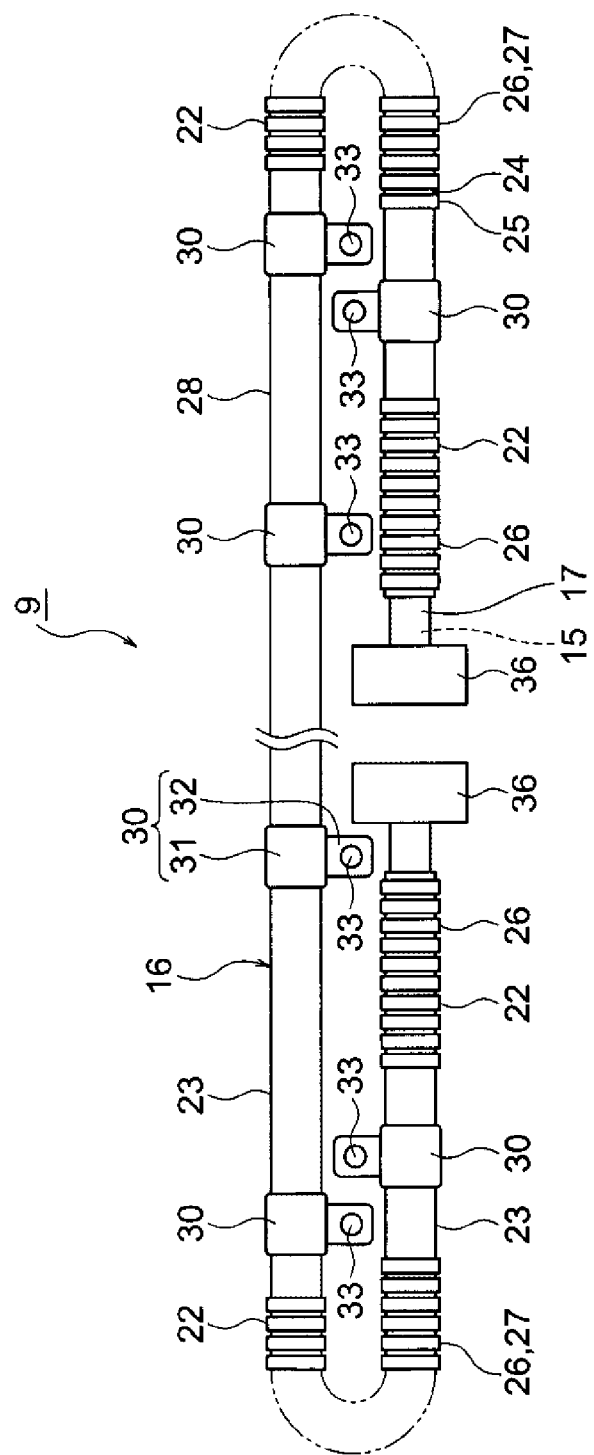
FIG. 5 shows the wire harness during transport.

Hereinafter, a first embodiment will be described with reference to the accompanying drawings. FIG. 1 is a schematic view showing a routed state of a wire harness according to the embodiment of the present invention. Further, FIG. 2 is a configuration view of an electrically-conducting path of the wire harness, FIGS. 3A and 3B are configuration views of an exterior member of the wire harness, FIG. 4 shows the wire harness during routing and FIG. 5 shows the wire harness during transport.

In the present embodiment, it is assumed that the present invention is applied to a wire harness which is routed in a hybrid vehicle (or, an electric vehicle or a general vehicle).

In FIG. 1, reference numeral 1 indicates a hybrid vehicle. The hybrid vehicle 1 is driven by a mixed power of an engine 2 and a motor unit 3. Electric power from a battery 5 (battery pack) is supplied to the motor unit 3 via an inverter unit 3. In the present embodiment, the engine 2, the motor unit 3 and the inverter unit 4 are mounted on an engine room 6 located at a position where front wheels, etc., are provided. Further, the battery 5 is mounted on a vehicle rear portion 7 located at a position where rear wheels, etc., are provided. The battery 5 may be mounted on a vehicle interior which is provided in the rear of the engine room 6.

The motor unit 3 and the inverter unit 4 are connected to each other by a high-voltage wire harness 8. Further, the battery 5 and the inverter unit 4 are also connected to each other by a high-voltage wire harness 9. A middle portion 10 of the wire harness 9 is routed in a vehicle floor 11. Further, the middle portion 10 is routed substantially parallel along the vehicle floor 11. The vehicle floor 11 is a known body and also so-called a panel member. A through-hole (reference numeral is omitted) is formed at a predetermined position of the vehicle floor 11. The wire harness 9 is inserted into the through-hole.

The wire harness 9 and the battery 5 are connected to each other via a junction block 12 which is provided in the battery 5. A rear end 13 of the wire harness 9 is electrically connected to the junction block 12 in a known manner. A front end 14 of the wire harness 9 is electrically connected to the inverter unit 4 in a known manner.

The motor unit 3 is configured to include a motor and a generator. Further, the inverter unit 4 is configured to include an inverter and a converter. The motor unit 3 is formed as a motor assembly including a shield casing. Further, the inverter unit 4 is also formed as an inverter assembly including a shield casing. The battery 5 is a Ni-MH based or Li-ion based battery and configured as a module. In addition, an electrical storage device such as a capacitor may be used, for example. The battery 5 is not particularly limited, as long as the battery can be used in the hybrid vehicle or an electric vehicle.

First, a configuration and structure of the wire harness 9 will be described. The wire harness 9 is a high-voltage member for electrically connecting the inverter unit 4 and the battery 5 as described above and includes a high-voltage coaxial composite electrically-conducting path 15 (electrically-conducting path), an exterior member 16 and an electromagnetic shielding member 17. The wire harness 9 having such a configuration is fixedly mounted to a vehicle floor 11 of a vehicle or the like via a clamp 30 (will be described later) which is a later-attached component.

In FIG. 2, the high-voltage coaxial composite electrically-conducting path 15 is configured to include a plus circuit and a minus circuit in a single. That is, the wire harness is configured to include a dual-system circuit. Specifically, the high-voltage coaxial composite electrically-conducting path 15 includes a first electrically-conducting path 18 which is located in the center thereof and has a circular cross-section, a first insulator 19 which covers an outer periphery of the first electrically-conducting path 18 in a predetermined thickness, a second electrically-conducting path 20 which is provided on the outside of the first insulator 19 and a second insulator 21 which covers an outer periphery of the second electrically-conducting path 20 in a predetermined thickness. The high-voltage coaxial composite electrically-conducting path 15 of the present embodiment further includes the cylindrical electromagnetic shielding member 17 which is in close contact with an outer surface of the second insulator 21 and a sheath (not shown) which covers an outer periphery of the electromagnetic shielding member 17 in a predetermined thickness.

The cylindrical electromagnetic shielding member 17 is interposed between the high-voltage coaxial composite electrically-conducting path 15 and the exterior member 16. The electromagnetic shielding member 17 is made of a known braided member or a metal foil or the like. In addition to the arrangement that the electromagnetic shielding member 17 is included in the configuration of the high-voltage coaxial composite electrically-conducting path 15 as described above, the electromagnetic shielding member 17 may be arranged as follows. That is, the electromagnetic shielding member 17 may be disposed in somewhat loose state with respect to the second insulator 21. Further, the electromagnetic shielding member 17 may be wound around and be in close contact with an outer surface of the second insulator 21 (in this case, the sheath is not provided).

As an electrically-conducting path other than the high-voltage coaxial composite electrically-conducting path 15, a known high-voltage electric wire including a conductor and an insulator, a shielded electric wire and a cab-tire cable or the like may be employed. In the present embodiment, the high-voltage coaxial composite electrically-conducting path 15 is a dual-system type. However, the high-voltage coaxial composite electrically-conducting path is not limited to this type but may be a triple-, quad- or more system type.

In FIGS. 2, 3A and 3B, the exterior member 16 is a tubular body (a tubular body for housing and protecting) to cover an electrically-conducting path such as the high-voltage coaxial composite electrically-conducting path 15 and is formed to have a length required to house the high-voltage coaxial composite electrically-conducting path 15 and a thickness required to protect the high-voltage coaxial composite electrically-conducting path 15. In the present embodiment, the exterior member 16 is formed into a shape with a circular cross-section (this cross-sectional shape is considered as an example and an elliptical shape, an oblong shape or a rectangular shape may be employed). This exterior member 16 includes a plurality of flexible tubular parts 22 having flexibility and a plurality of less-flexible tubular parts 23 having less flexibility than that of the flexible tubular part 22.

The flexible tubular parts 22 and the less-flexible tubular parts 23 are integrally formed in a linear fashion as a whole in a state where the flexible tubular parts 22 are not deflected. The flexible tubular parts 22 and the less-flexible tubular parts 23 are alternately connected continuously in a pipe axial direction.

The flexible tubular parts 22 are disposed at arbitrary positions to match a vehicle mount shape. Further, the flexible tubular parts 22 are formed in a length to match the vehicle mount shape. In addition, by varying the length of the flexible tubular parts 22 in the pipe axial direction, the flexible tubular parts 22 can be deflected in a required length to match the vehicle mount shape. These flexible tubular parts 22 can be deflected at desired angles respectively during transport of the wire harness and during routing of the wire harness in the vehicle, which will be described later. In addition, the flexible tubular parts 22 can be deflected in a bent shape and can be returned to its original straight shape, of course.

In the present embodiment, the flexible tubular parts 22 are formed into a shape of bellows tube. The shape of the flexible tubular parts 22 is not particularly limited, as long as the flexible tubular parts 22 have flexibility. Specifically, the flexible tubular part 22 is provided with circumferential recess portions 24 and circumferential projecting portions 25, which are alternately formed continuously in the pipe axial direction.

The flexible tubular part 22 includes a flexible tubular portion 26 (see FIG. 4) for routing which is deflected during routing of the wire harness and a flexible tubular portion 27 (see FIG. 5) for transport which is deflected during transport of the wire harness. In addition, a portion which is not required to be deflected may be arranged to form the flexible tubular part 22a.

A portion of the exterior member 16 on which the flexible tubular parts 22 are arranged is formed into a shape like a corrugated tube. In other words, the exterior member 16 is formed into a shape in which corrugated tubes are partially provided. Since the exterior member 16 has corrugated tube portions as described above, the exterior member is also referred to as a "corrugated tube" or a "partial corrugated tube".

The exterior member 16 has a shape which is not provided with slits (split portions) along a pipe axial direction thereof.

As a reason for not providing the slits, it is mentioned that the ingress of moisture into the exterior member 16 can be prevented and therefore the waterproof property can be enhanced. As another reason for not providing the slits, it is also mentioned that the high-voltage coaxial composite electrically-conducting path 15 does not protrude at the portions to be deflected, for example. Further, as yet another reason for not providing the slits, it is also mentioned that the rigidity of the exterior member 16 itself can be enhanced.

The less-flexible tubular parts 23 are formed as a deflection regulating part (a bending regulating part) or a part to which clamps 30 (described later) being a later-attached component are mounted. Since the less-flexible tubular parts 23 have a straight tubular shape as shown, the less-flexible tubular parts can be also referred to as a "straight tubular part" or a "straight part". In the present embodiment, the less-flexible tubular parts 23 are formed into a shape with a circular cross-section (the cross-sectional shape thereof is not limited to this circular shape and an elliptical shape or an oblong shape may be employed). The less-flexible tubular parts 23 are formed at more rigid portions, as compared to the flexible tubular parts 22. Similar to the flexible tubular parts 22, the less-flexible tubular parts 23 are also formed in a length to match the vehicle mount shape.

The less-flexible tubular parts 23 include a less-flexible tubular portion 28 for the floor, which is routed in the vehicle floor 11 (see FIG. 1 and FIG. 4). Since the less-flexible tubular portion 28 for the floor is routed in the vehicle floor 11 (for example, routed along reinforcement), the less-flexible tubular portion 28 for the floor is formed to be long. In addition, when the interference may be caused during transport of the wire harness because the less-flexible tubular portion 28 for the floor is long, a flexible tubular portion 29 for transport may be arranged in the middle of the less-flexible tubular portion 28 for the floor, as shown in FIG. 3B. In this case, the flexible tubular portion 29 for transport is deflected only during transport of the wire harness.

In FIG. 4, a known clamp is used as the clamp 30 to be mounted to the less-flexible tubular parts 23.

The clamp 30 includes a tubular body mounting portion 31 formed to match an outer shape of the less-flexible tubular part 23 and a cantilever-shaped fixing portion 32 continuous to the tubular body mounting portion 31. A bolt insertion hole 33 (see FIG. 5) is formed through the fixing portion 32. The wire harness 9 is fixedly mounted to a fixed object 35 such as the vehicle floor 11 by a bolt 34 inserted into the bolt insertion hole 33. Here, the shape of the fixed object 35 is illustrative. As the wire harness 9 is fixedly mounted to the fixed object 35, a routing operation is completed, as shown in FIG. 4.

In addition, as a later-attached component other than the clamp 30, a clip, a grommet or a protector or the like may be employed. The clamp 30 also serves as a vehicle fixed part. Such a part serving as the vehicle fixed part may be integrally resin-molded with the less-flexible tubular part 23.

A known shield connector 36 is respectively provided on both ends of the wire harness 9. One of the shield connectors 36 is an inverter-side shield connector and the other thereof is a battery-side shield connector. In the present embodiment, the shield connectors 36 are fixedly connected to the high-voltage coaxial composite electrically-conducting path 15 and the electromagnetic shielding member 17, which are drawn from the flexible tubular part 22.

Next, the manufacturing, transporting and routing of the wire harness 9 are described. The wire harness 9 is manufactured by inserting the high-voltage coaxial composite electrically-conducting path 15 into the exterior member 16 and then providing the shield connectors 36 on both ends thereof.

After the manufacturing of the wire harness 9, when the wire harness is deflected in a folding manner at the portion of the flexible tubular portions 27 for transport, as shown in FIG. 5, the less-flexible tubular parts 23 (in FIG. 5, the less-flexible tubular part 23 and the less-flexible tubular portion 28 for the floor) are arranged substantially parallel to each other. More specifically the less-flexible tubular parts 23 are arranged substantially parallel to and along the long less-flexible tubular portion 28 for the floor. By such a state, the entire length of the wire harness 9 is shortened and the wire harness 9 is packed in a minimum width. That is, entire wire harness 9 is packed in a compact state and transported as it is in the compact state.

As the wire harness 9 is fixedly mounted to the fixed object 35 via the clamps 30, as shown in FIG. 4, the routing operation is completed.

As has been described above with reference to FIG. 1 to FIG. 5, the wire harness 9 according to the present embodiment includes the high-voltage coaxial composite electrically-conducting path 15 and the exterior member 16 to cover the high-voltage coaxial composite electrically-conducting path 15. Since the exterior member 16 is made from resin, weight reduction can be obtained. Further, the exterior member 16 includes a plurality of flexible tubular parts 22 and a plurality of less-flexible tubular parts 23, which are integrally formed in the pipe axial direction. With this configuration, the number of components can be reduced to one and therefore it is possible to improve the assembling workability.

Since the exterior member 16 can be deflected at desired angles at positions of the flexible tubular parts 22 respectively during transport of the wire harness and during routing of the wire harness in the vehicle, the wire harness 9 can be transported in a compact state and the routing of the wire harness 9 in the vehicle can be easily performed.

In addition, since the high-voltage coaxial composite electrically-conducting path 15 is configured by coaxially arranging a plurality of circuits, the size of the electrically-conducting path can be reduced, as compared to a case where a plurality of electrically-conducting paths is simply arranged. As a result, it is also possible to reduce a diameter of the exterior member 16.

Since the wire harness 9 is formed by using the high-voltage coaxial composite electrically-conducting path 15 configured by coaxially arranging a plurality of circuits and inserting the high-voltage coaxial composite electrically-conducting path 15 into the exterior member 16, deviation of length does not occur in the ends of the high-voltage coaxial composite electrically-conducting path 15 with an integral configuration even when the exterior member 16 is deflected at positions of the flexible tubular parts 22. That is, it is possible to prevent the deviation of length.

Second Embodiment

Figure 6:
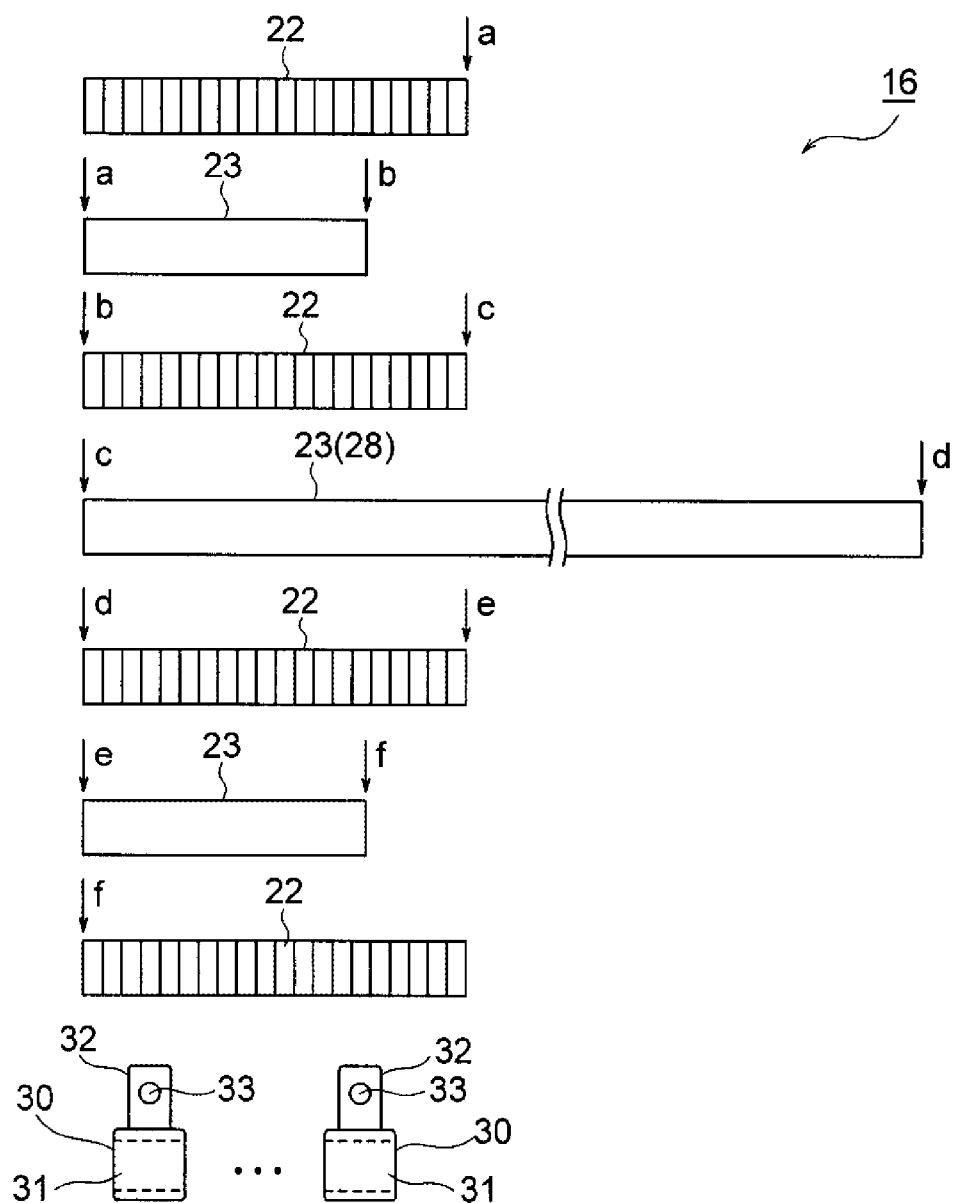
FIG. 6 is a configuration view of an exterior member according to another embodiment (Second Embodiment).
Figure 7:
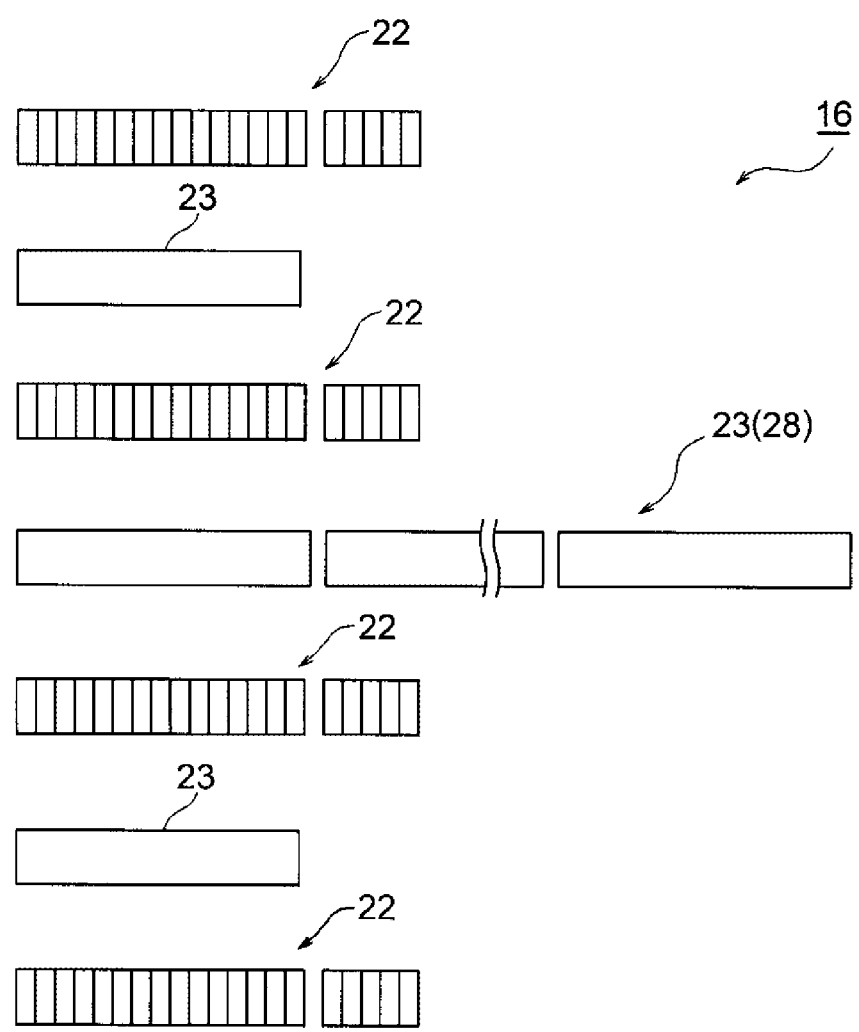
FIG. 7 shows a modification of FIG. 6.

Hereinafter, a second embodiment will be described with reference to the drawings. FIG. 6 is a configuration view of an exterior member according to another embodiment. Further, FIG. 7 shows a modification of FIG. 6 and FIG. 8 is an enlarged view showing a portion of the exterior member in which a flexible tubular part and a less-flexible tubular part are integrated. In addition, the same or similar element will be denoted by the same reference numeral as that of the first embodiment and a duplicated explanation thereof will be omitted.

In FIG. 6, the exterior member 16 is a resin tubular body to cover an electrically-conducting path and formed to have a length required to house the electrically-conducting path and a thickness required to protect the electrically-conducting path. The exterior member 16 includes a plurality of flexible tubular parts 22 having flexibility and a plurality of less-flexible tubular parts 23 having less flexibility than that of the flexible tubular part 22. The exterior member 16 of the present embodiment is formed in a state shown in FIGS. 3A and 3B by separately forming the flexible tubular parts 22 and the less-flexible tubular parts 23 in a spilt state and then integrating the flexible tubular parts 22 and the less-flexible tubular parts 23. In addition, upon integration of the flexible tubular parts 22 and the less-flexible tubular parts 23, it is assumed that a means described below or the clamp 30 or the like is used.

The exterior member 16 is formed by connecting and integrating respective ends "a", "a" to "f", "f" of the flexible tubular parts 22 and the less-flexible tubular parts 23 using a bonding means, an adhesive means or a taping or the like (which are not shown). Alternatively, the exterior member 16 may be formed by connecting and integrating the respective ends "a", "a" to "f", "f" by the clamps 30. Here, prior to mounting the clamps 30, the respective ends may be connected to each other in advance by the bonding means or the like.

In addition, although the flexible tubular parts 22 and the less-flexible tubular parts 23 are separately formed in a split state in FIG. 6, the present invention is not limited to this configuration. For example, as shown in FIG. 7, the flexible tubular part 22 is divided in plural and formed in a split state and the less-flexible tubular part 23 is similarly divided in plural and formed in a split state. And then, the flexible tubular part 22 and the less-flexible tubular part 23 may be integrated (may be connected and integrated by a bonding means, an adhesive means or a taping or the like).

When using the clamp 30, for example, in FIG. 8, the flexible tubular part 22 and the less-flexible tubular part 23 are integrated in a state where respective ends thereof abut against each other. In the present embodiment, a flexible tubular part engaging part 37 and a less-flexible tubular part engaging part 38 are provided in an inner surface of the tubular body mounting portion 31 of the clamp 30. The flexible tubular part engaging part 37 and the less-flexible tubular part engaging part 38 are provided as parts to have the functions of preventing omission, preventing rotation and preventing ingress of moisture, etc.

According to the second embodiment, the following effects can be further achieved, in addition to the effects of the first embodiment. That is, since the flexible tubular parts 22 and the less-flexible tubular parts 23 are separately formed in a split state, the positions to be deflected, for example, can be arbitrarily set depending on the arrangement of the flexible tubular parts and the less-flexible tubular parts when integrating. Further, when the flexible tubular parts 22 and the less-flexible tubular parts 23 are separately formed in a split state, the long exterior member 16 can be manufactured in various ways without using large-scale equipment.

Third Embodiment

Figure 10A:
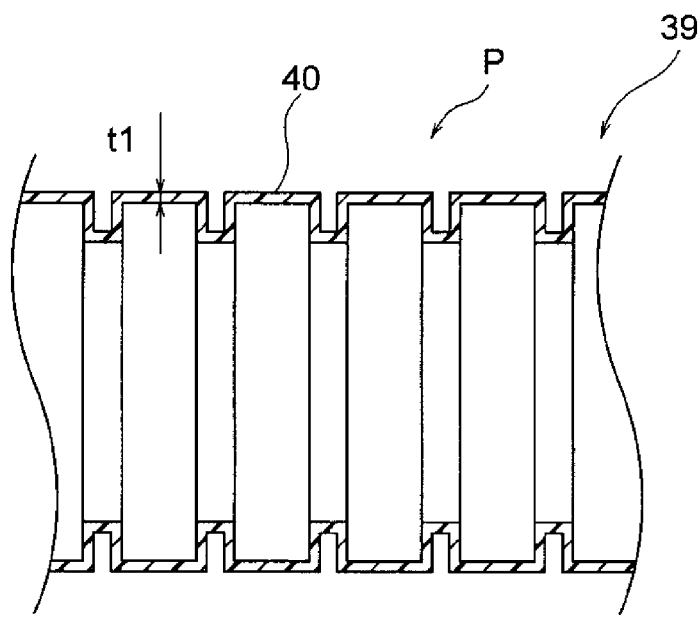
FIGS. 10A and 10B are enlarged sectional views of the portions of an arrow "P" and an arrow "Q" in FIG. 9, respectively.
Figure 10B:
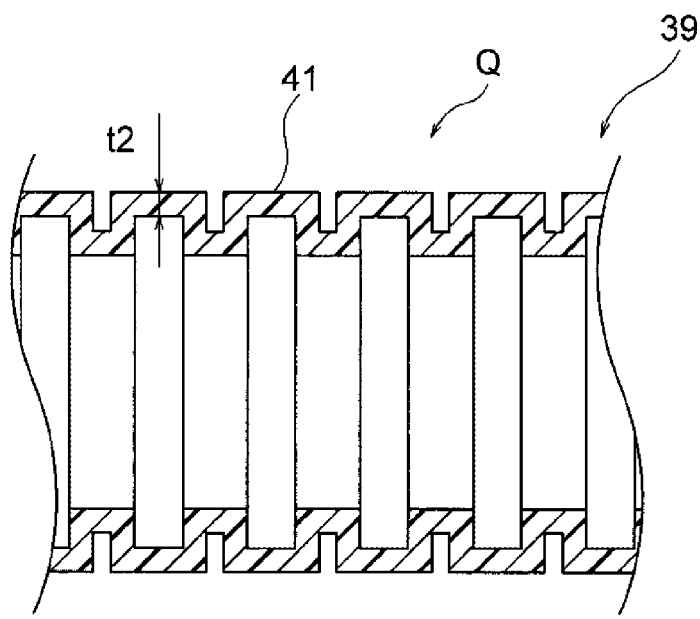

Hereinafter, a third embodiment will be described with reference to the drawings. FIG. 9 is a configuration view of an exterior member according to yet another embodiment. Further, FIGS. 10A and 10B are enlarged sectional views of the portions of an arrow "P" and an arrow "Q" in FIG. 9.

In FIG. 9, an exterior member 39 is a resin tubular body to cover an electrically-conducting path and formed to have a length required to house the electrically-conducting path and have a thickness required to protect the electrically-conducting path. The exterior member 39 includes a plurality of flexible tubular parts 40 having flexibility and a plurality of less-flexible tubular parts 41 having less flexibility than that of the flexible tubular part 40.

In the exterior member 39 of the present embodiment, the flexible tubular parts 40 and the less-flexible tubular parts 41 are formed in the shape of the same bellows tube. Further, the exterior member 39 is continuously formed while changing the thickness thereof in a state where an outer shape thereof is unified. Specifically, as shown in FIG. 10A, thin portions (portions of ranges g, i, k, m in FIG. 9) are formed as the flexible tubular parts 40 and as shown in FIG. 10B, thick portions (portions of ranges h, j, l in FIG. 9) thicker than the flexible tubular parts 40 are formed as the less-flexible tubular parts 41 (t1<t2).

In addition, the thickness can be easily changed by using a known apparatus for manufacturing a corrugated tube and causing the line speed of the manufacturing apparatus to be increased and decreased. Since an outer shape of the exterior member 39 is unified, the exterior member 39 has the same outer appearance as the known corrugated tube. Although an inner shape of the exterior member 39 may be unified, it is desirable that an outer shape of the exterior member 39 is unified, from the standpoint of manufacturability or appearance.

According the third embodiment, the following effects can be further achieved, in addition to the effects of the first embodiment. That is, the exterior member 39 including the flexible tubular parts 40 and the less-flexible tubular parts 41 can be simply formed by the change in the thickness thereof. Further, since the exterior member 39 has a shape of bellows tube, a mounting operation can be easily carried out when attempting to mount a later-attached component (not shown) thereto. Furthermore, since the exterior member has a unified outer appearance, a molding die according to such a unified outer appearance can be made to have the same structure, thereby contributing to save reduction.

Fourth Embodiment

Figure 11:
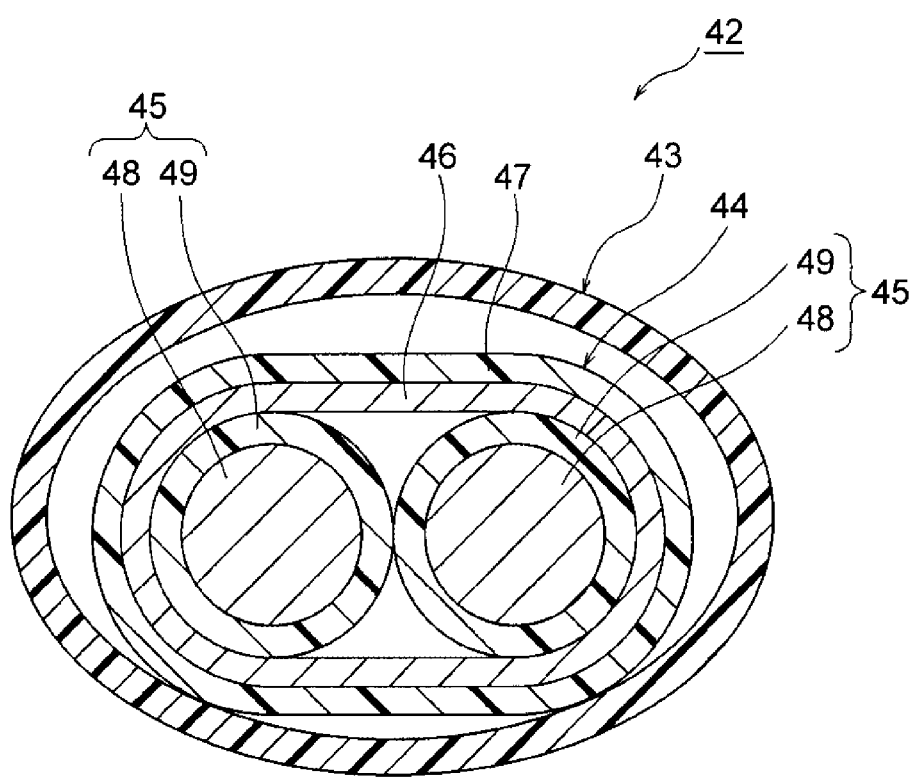
FIG. 11 is a configuration view of an electrically-conducting path according to another embodiment (Fourth Embodiment).

Hereinafter, a fourth embodiment will be described with reference to the drawings. FIG. 11 is a configuration view of an electrically-conducting path according to another embodiment.

In FIG. 11, the wire harness 42 includes an exterior member 43 having an elliptical cross-section and a high-voltage electrically-conducting path 44 (electrically-conducting path) which is covered and protected by the exterior member 43. In addition, the exterior member 43 of the fourth embodiment is different from that of the first embodiment only in the cross-sectional shape. That is, the cross-sectional shape of the exterior member 43 is formed to match the high-voltage electrically-conducting path 44. Accordingly, a detailed description thereof will be omitted herein.

The high-voltage electrically-conducting path 44 includes two high-voltage circuits 45, an electromagnetic shielding member 46 to cover these two high-voltage circuits 45 and a sheath 47 provided on the outside of the electromagnetic shielding member 46.

Herein, the high-voltage circuit 45 is a known high-voltage electric wire and includes a conductor 48 and an insulator 49 to cover the conductor 48. The high-voltage circuit 45 is formed to have a length required for electric connection.

The conductor 48 is produced by copper or copper alloy, aluminum or aluminum alloy. The conductor 48 may have a conductor structure consisting of wires stranded together or a rod-shaped conductor structure (for example, a conductor structure of a straight angle single core or a circular single core and, in this case, the electric wire itself has a rod shape) having a rectangular cross-section or a circular cross-section. Insulators 49 made of insulative resin material are extrusion-molded to an outer surface of the conductors 48 as described above.

In addition, although the high-voltage circuit 45 has employed a configuration of a known high-voltage electric wire in the present embodiment, the present invention is not limited to this configuration. That is, a high-voltage circuit obtained by providing an insulator in a known busbar may be employed.

The electromagnetic shielding member 46 is a member (a shielding member for protection against the electromagnetic wave) for electromagnetic shielding to collectively cover two high-voltage circuits 45 and may employ a known braided member formed by knitting a plurality of wires into a cylindrical shape. The electromagnetic shielding member 46 is formed to have substantially the same length as the entire length of two high-voltage circuits 45. The electromagnetic shielding member 46 has an end that is connected to a shield casing of the inverter unit 4 (see FIG. 1) or the like via a connection part (not shown).

For example, the electromagnetic shielding member 46 may employ a conductive metallic foil or a member including this conductive metallic foil, as long as the countermeasures for the electromagnetic wave can be achieved.

The sheath 47 is formed by extrusion-molding the insulative resin material on the outside of the electromagnetic shielding member 46 in a predetermined thickness and disposed at a position which is an outermost layer of the high-voltage electrically-conducting path 44. In the manufacture of the wire harness 42, the sheath 47 is subjected to a terminal processing so that the electromagnetic shielding member 46 is exposed in a predetermined length.

The wire harness 42 including the high-voltage electrically-conducting path 44 as described above may be used.

Of course, the present invention can be variously modified and implemented in a range without changing the gist of the invention.

The wire harness according to the present invention can be transported in a lightweight and compact state and a wire harness in which the number of components can be reduced and therefore it is possible to improve the assembling workability.

What is claimed is:

1. A wire harness comprising:
   one or more electrically-conducting paths; and
   a tubular exterior member configured to cover the electrically-conducting paths, wherein
   the exterior member is a resin member including a plurality of flexible tubular parts having flexibility and a plurality of less-flexible tubular parts having less flexibility than that of the plurality of flexible tubular parts, wherein the plurality of flexible tubular parts and the plurality of less-flexible tubular parts are alternately connected and integrated via connecting members, and
   the exterior member is integrally formed to have a linear shape as a whole in a state where the flexible tubular part is not deflected.

2. The wire harness according to claim 1, wherein
   each of the flexible tubular parts is disposed at an arbitrary position to match a vehicle mount shape and deflected in a desired angle respectively during transport of the wire harness and during routing of the wire harness in a vehicle.

3. The wire harness according to claim 1, wherein
   the exterior member is configured by mounting a later-attached component to the less-flexible tubular part.

4. The wire harness according to claim 1, wherein
   the exterior member is configured by integrally forming a vehicle fixed part to the less-flexible tubular part.

5. The wire harness according to claim 4, wherein
   the plurality of flexible tubular parts have different lengths in a pipe axial direction.

6. The wire harness according to claim 1, wherein
   during transport of the wire harness, the exterior member is arranged in a state where the flexible tubular parts are deflected in a folding manner and therefore the less-flexible tubular parts are disposed substantially parallel to each other.

7. The wire harness according to claim 5, wherein
   the flexible tubular parts include a flexible tubular portion for transport which is deflected only during transport of the wire harness.

8. The wire harness according to claim 5, wherein
   the flexible tubular parts include a flexible tubular portion for routing which is deflected only during routing of the wire harness.

9. The wire harness according to claim 1, wherein
   each of the connecting members is a bonding means, an adhesive means, or a taping.

10. The wire harness according to claim 1, wherein
    each of the connecting members is a clamp which has a tubular part mounting portion, wherein a flexible tubular part engaging part and a less-flexible tubular part engaging part are provided in an inner surface of the tubular body mounting portion of the clamp.

11. The wire harness according to claim 1, wherein
    the electrically-conducting path is a high-voltage coaxial composite electrically-conducting path which is configured by coaxially arranging a plurality of high-voltage circuits.

* * * * *